United States Patent
Taherzadeh Boroujeni et al.

(10) Patent No.: US 11,737,108 B2
(45) Date of Patent: Aug. 22, 2023

(54) ALTERNATIVELY SIZED DOWNLINK CONTROL INFORMATION MESSAGES FOR SCHEDULING REMAINING MINIMUM SYSTEM INFORMATION TRANSMISSIONS

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/221,290

(22) Filed: Apr. 2, 2021

(65) Prior Publication Data

US 2021/0321374 A1    Oct. 14, 2021

Related U.S. Application Data

(60) Provisional application No. 63/009,333, filed on Apr. 13, 2020.

(51) Int. Cl.
| | | |
|---|---|---|
| *H04W 72/10* | (2009.01) | |
| *H04W 72/23* | (2023.01) | |
| *H04L 1/00* | (2006.01) | |
| *H04L 5/00* | (2006.01) | |

(52) U.S. Cl.
CPC .......... *H04W 72/23* (2023.01); *H04L 1/0038* (2013.01); *H04L 5/0048* (2013.01)

(58) Field of Classification Search
CPC ... H04W 72/042; H04L 1/0038; H04L 5/0048
See application file for complete search history.

(56) References Cited

U.S. PATENT DOCUMENTS

| | | |
|---|---|---|
| 2018/0324843 A1 | 11/2018 | Lee et al. |
| 2019/0110290 A1 | 4/2019 | Sun et al. |
| 2019/0200307 A1 | 6/2019 | Si et al. |
| 2019/0223084 A1 | 7/2019 | John Wilson et al. |

(Continued)

FOREIGN PATENT DOCUMENTS

| | | |
|---|---|---|
| EP | 3661261 A1 | 6/2020 |
| WO | 2014181156 A1 | 11/2014 |

(Continued)

OTHER PUBLICATIONS

International Search Report and Written Opinion—PCT/US2021/025765—ISA/EPO—dated Jul. 9, 2021.

(Continued)

*Primary Examiner* — Ronald B Abelson
(74) *Attorney, Agent, or Firm* — Harrity & Harrity LLP/Qualcomm Incorporated (57) ABSTRACT

Various aspects of the present disclosure generally relate to wireless communication. In some aspects, a user equipment may receive, via a physical broadcast channel message, an indication to attempt to decode, based at least in part on an assumption of an alternative size that is different from a default size, a downlink control information (DCI) message that schedules a remaining minimum system information (RMSI) transmission; and receive the RMSI transmission based at least in part on the DCI message. Numerous other aspects are provided.

30 Claims, 6 Drawing Sheets

(56) References Cited

U.S. PATENT DOCUMENTS

| | | | | |
|---|---|---|---|---|
| 2019/0357194 A1* | 11/2019 | Hwang | ............. | H04W 72/0406 |
| 2020/0267697 A1* | 8/2020 | Liu | ....................... | H04L 5/0044 |
| 2021/0058205 A1* | 2/2021 | Zhu | ....................... | H04L 1/0072 |
| 2021/0127367 A1* | 4/2021 | Yi | ..................... | H04W 72/0453 |
| 2022/0060992 A1* | 2/2022 | Xue | .................. | H04W 52/0235 |

FOREIGN PATENT DOCUMENTS

| | | | |
|---|---|---|---|
| WO | 2019019938 A1 | 1/2019 | |
| WO | 2019160477 A1 | 8/2019 | |

OTHER PUBLICATIONS

VIVO: "On Compact DCI", 3GPP Draft, R1-1803831, 3GPP TSG RAN WG1 Meeting #92bis, On Compact DCI, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051426126, pp. 1-4, Retrieved from the Internet: URL: http://www.3gpp.org/ftp/Meetings%5F3GPP%5FSYNC/RAN1/Docs/ [retrieved on Apr. 15, 2018] the whole document.

\* cited by examiner

ALTERNATIVELY SIZED DOWNLINK CONTROL INFORMATION MESSAGES FOR SCHEDULING REMAINING MINIMUM SYSTEM INFORMATION TRANSMISSIONS

CROSS-REFERENCE TO RELATED APPLICATION

This patent application claims priority to Provisional Patent Application No. 63/009,333, filed on Apr. 13, 2020, entitled "ALTERNATIVELY SIZED DOWNLINK CONTROL INFORMATION MESSAGES FOR SCHEDULING REMAINING MINIMUM SYSTEM INFORMATION TRANSMISSIONS," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for an alternative size for downlink control information messages for scheduling remaining minimum system information transmissions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment, may include receiving, via a physical broadcast channel (PBCH) message, an indication to attempt to decode, based at least in part on an assumption of an alternative size that is different from a default size, a downlink control information (DCI) message that schedules a remaining minimum system information (RMSI) transmission; and receiving the RMSI transmission based at least in part on the DCI message.

In some aspects, a method of wireless communication, performed by a base station, may include transmitting, via a PBCH message, an indication to attempt to decode, based at least in part on an assumption of an alternative size that is different from a default size, a DCI message that schedules a RMSI transmission; and transmitting the RMSI transmission based at least in part on the DCI message.

In some aspects, a user equipment for wireless communication may include a memory and one or more processors coupled to the memory. The memory and the one or more processors may be configured to receive, via a PBCH message, an indication to attempt to decode, based at least in part on an assumption of an alternative size that is different from a default size, a DCI message that schedules a RMSI transmission; and receive the RMSI transmission based at least in part on the DCI message.

In some aspects, a base station for wireless communication may include a memory and one or more processors coupled to the memory. The memory and the one or more processors may be configured to transmit, via a PBCH message, an indication to attempt to decode, based at least in part on an assumption of an alternative size that is different from a default size, a DCI message that schedules a RMSI transmission; and transmit the RMSI transmission based at least in part on the DCI message.

In some aspects, a non-transitory computer-readable medium may store one or more instructions for wireless communication. The one or more instructions, when executed by one or more processors of a UE, may cause the one or more processors to receive, via a PBCH message, an indication to attempt to decode, based at least in part on an assumption of an alternative size that is different from a default size, a DCI message that schedules a RMSI transmission; and receive the RMSI transmission based at least in part on the DCI message.

In some aspects, a non-transitory computer-readable medium may store one or more instructions for wireless communication. The one or more instructions, when executed by one or more processors of a base station, may cause the one or more processors to transmit, via a PBCH message, an indication to attempt to decode, based at least in part on an assumption of an alternative size that is different from a default size, a DCI message that schedules a RMSI transmission; and transmit the RMSI transmission based at least in part on the DCI message.

In some aspects, an apparatus for wireless communication may include means for receiving, via a PBCH message, an indication to attempt to decode, based at least in part on an assumption of an alternative size that is different from a default size, a DCI message that schedules a RMSI transmission; and means for receiving the RMSI transmission based at least in part on the DCI message.

In some aspects, an apparatus for wireless communication may include means for transmitting, via a PBCH message, an indication to attempt to decode, based at least in part on an assumption of an alternative size that is different from a default size, a DCI message that schedules a RMSI transmission; and means for transmitting the RMSI transmission based at least in part on the DCI message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
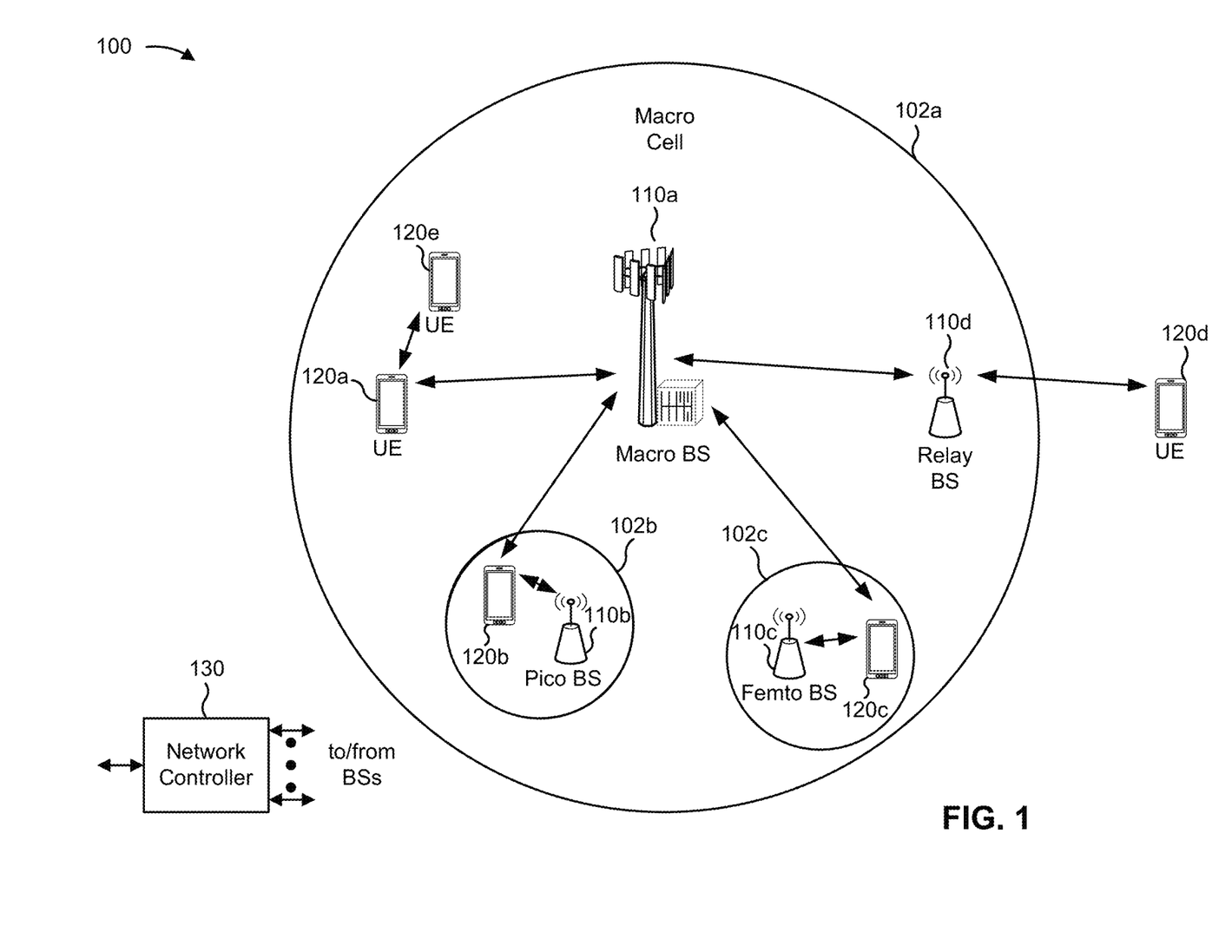
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
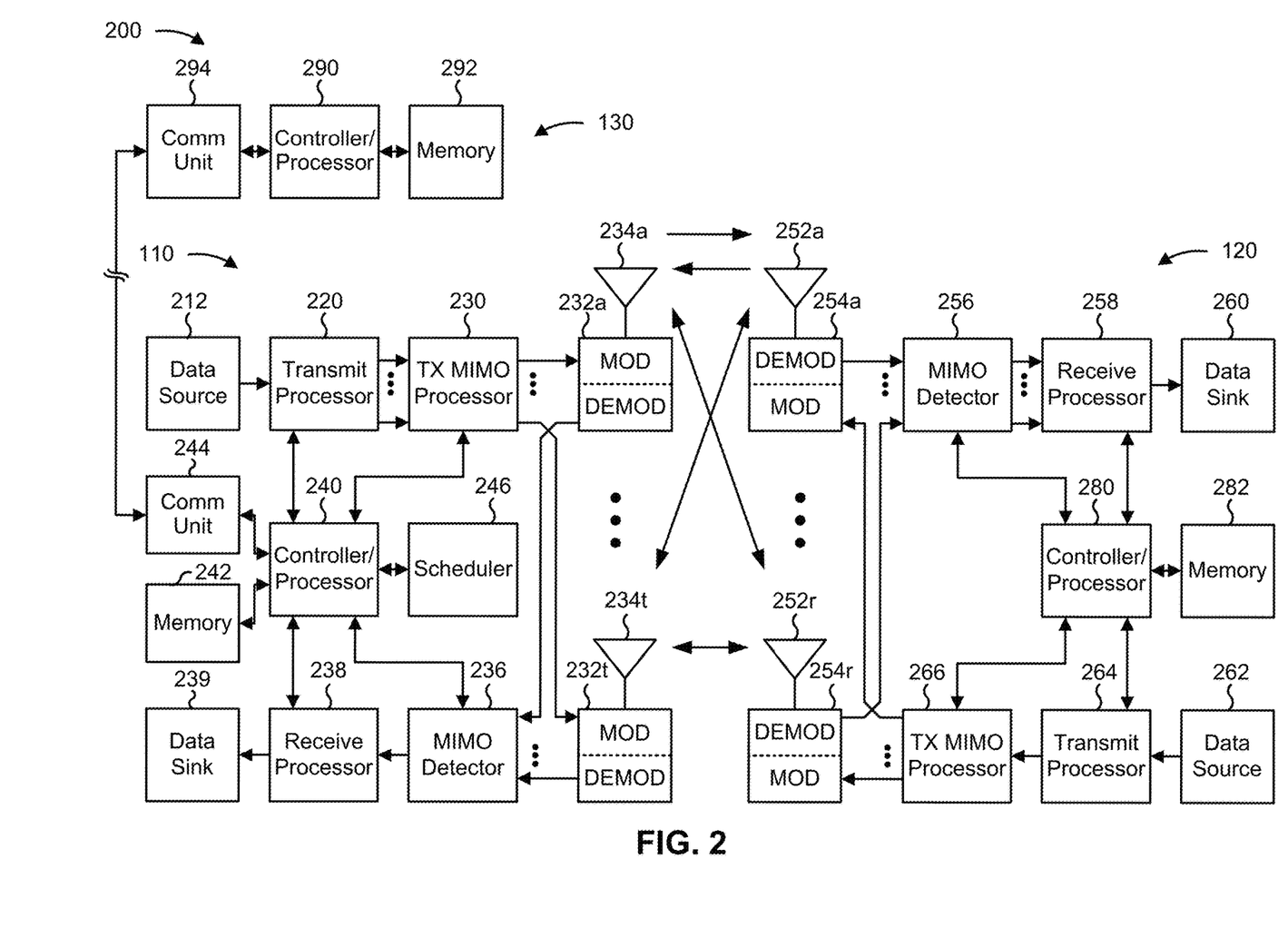
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-6).

Controller/processor 240 of base station 110, controller/processor 280 of UE 120, and/or any other component(s) of FIG. 2 may perform one or more techniques associated with an alternative size for DCI messages that schedule RMSI transmissions, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE includes means for receiving, via a physical broadcast channel message, an indication to blind detect, based at least in part on an assumption of an alternative size that is different from a default size, a DCI message that schedules an RMSI transmission; and/or means for receiving the RMSI transmission based at least in part on the DCI message. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an indication that schedules a channel state information reference signal (CSI-RS), wherein the indication that schedules the CSI-RS is an implicit indication to blind detect the DCI message based at least in part on the assumption of the alternative size.

In some aspects, the UE includes means for establishing a wireless link with the base station based at least in part on the RMSI transmission.

In some aspects, the base station includes means for transmitting, via a physical broadcast channel message, an indication to attempt to decode, based at least in part on an assumption of an alternative size that is different from a default size, a downlink control information (DCI) message that schedules a remaining minimum system information (RMSI) transmission; and/or means for transmitting the RMSI transmission based at least in part on the DCI message. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting an indication that schedules a CSI-RS, wherein the indication that schedules the CSI-RS is an implicit indication to attempt to decode the DCI message based at least in part on the assumption of the alternative size.

In some aspects, the base station includes means for establishing a wireless link with the UE based at least in part on the RMSI transmission.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
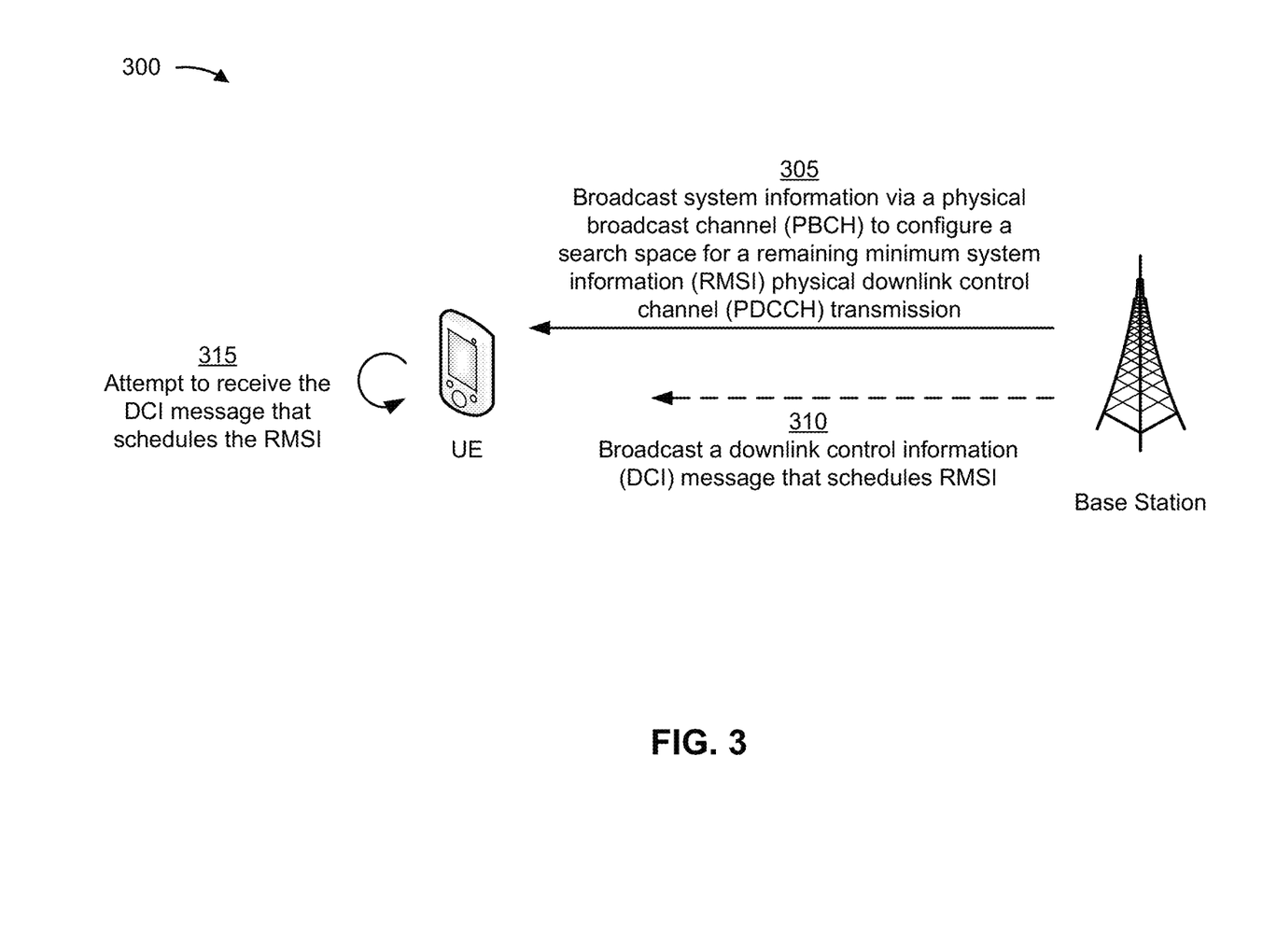
FIG. 3 is a diagram illustrating an example of broadcasting a configuration of a search space for a remaining minimum system information physical downlink control channel transmission and broadcasting a downlink control information message that schedules remaining minimum system information, in accordance with the present disclosure.

FIG. 3 is a diagram illustrating an example 300 of broadcasting a configuration of a search space for an RMSI physical downlink control channel (PDCCH) transmission and broadcasting a DCI message that schedules RMSI, in accordance with the present disclosure. As shown in FIG. 3, a UE may attempt to access a network associated with a base station. The UE may be configured to perform one or more actions to gain access to the network.

As shown by reference number 305, the base station may broadcast system information via a physical broadcast channel (PBCH) to configure a search space for an RMSI PDCCH transmission. For example, the base station may transmit (e.g., broadcast) system information (e.g., a master information block (MIB), a synchronization signal block (SSB), and/or the like) via the PBCH with physical layer information that indicates how to receive further system information. The physical layer indication may identify a search space for a PDCCH (e.g., a Type0-PDCCH common search space). In other words, the base station may broadcast system information via the PBCH that indicates, to one or more UEs, how to obtain further system information (e.g., a DCI message that schedules RMSI).

As shown by reference number 310, the base station may broadcast the DCI message (e.g., an RMSI PDCCH transmission) that schedules RMSI based at least in part on the system information. However, the base station may be configured to transmit the DCI message within a control resource set (e.g., CORESET) using a limited number of symbols (e.g., 2 symbols, 3 symbols, or the like). This may limit an amount of gain that may be achieved via repetitions of the DCI message. Additionally, the base station may transmit the DCI message using a wide beam (e.g., an omnidirectional beam, a pseudo-omnidirectional beam, and/or the like) that may not provide sufficient gain to reach the UE (e.g., a UE near an outer limit of a coverage area of the base station).

As shown by reference number 315, the UE may attempt to receive the DCI message that schedules the RMSI based at least in part on the system information. However, based at least in part on limited coverage of the DCI message, the UE may fail to receive the DCI message. This may cause the UE to fail to receive the RMSI that the UE is to use to establish a wireless link with the base station. Based at least in part on the UE failing to receive the DCI and/or the RMSI, the UE may wait for another PBCH occasion and attempt again to receive the DCI message. This may consume computing, communication, and/or network resources for the UE to repeatedly attempt and fail to establish a wireless link with the base station.

As indicated above, FIG. 3 is provided as an example. Other examples may differ from what is described with respect to FIG. 3.

In some aspects described herein, a base station may determine to transmit a DCI message, using an alternative size (e.g., a compact size), that schedules an RMSI transmission. The alternative size may be smaller than a default size (e.g., fallback DCI size) that a DCI message that schedules an RMSI transmission may generally use. For example, the default DCI size may be 40 bits and the alternative size may be 24 bits. In some networks, the base station may be configured to generally use the default size for the DCI message based at least in part on the base station being configured to communicate with legacy devices that are configured to receive only DCI messages having the default size.

The base station may transmit an indication (e.g., within the system information broadcast via the PBCH) that a UE is to attempt to decode, based at least in part on an assumption of the alternative size, the DCI message that schedules the RMSI. The UE may attempt to receive the DCI message (e.g., within a search space configured by the system information) by attempting to decode the DCI message using an assumption of the alternative size, using an assumption of the alternative size and additionally using an assumption of the default size, and/or the like. The UE may then receive the RMSI based at least in part on the DCI message that schedules the RMSI.

Based at least in part on the base station indicating (e.g., via the PBCH) that the UE is to attempt to decode the DCI message based at least in part on the assumption of the alternative size, the base station may transmit the DCI message with the alternative size, which may improve a coverage area of the transmission of the DCI message. For example, the DCI message may be transmitted using 24 bits instead of 40 bits, which may increase a signal strength by 1 dB when transmitted over a same number of symbols. This may improve a likelihood of the UE receiving the DCI message (e.g., relative to using a default size) and receiving the RMSI to configure the UE for establishing a wireless link with the base station. In this way, the UE may conserve computing, communication, and/or network resources that may otherwise have been used to repeatedly attempt and fail to establish a wireless link with the base station.

Figure 4:
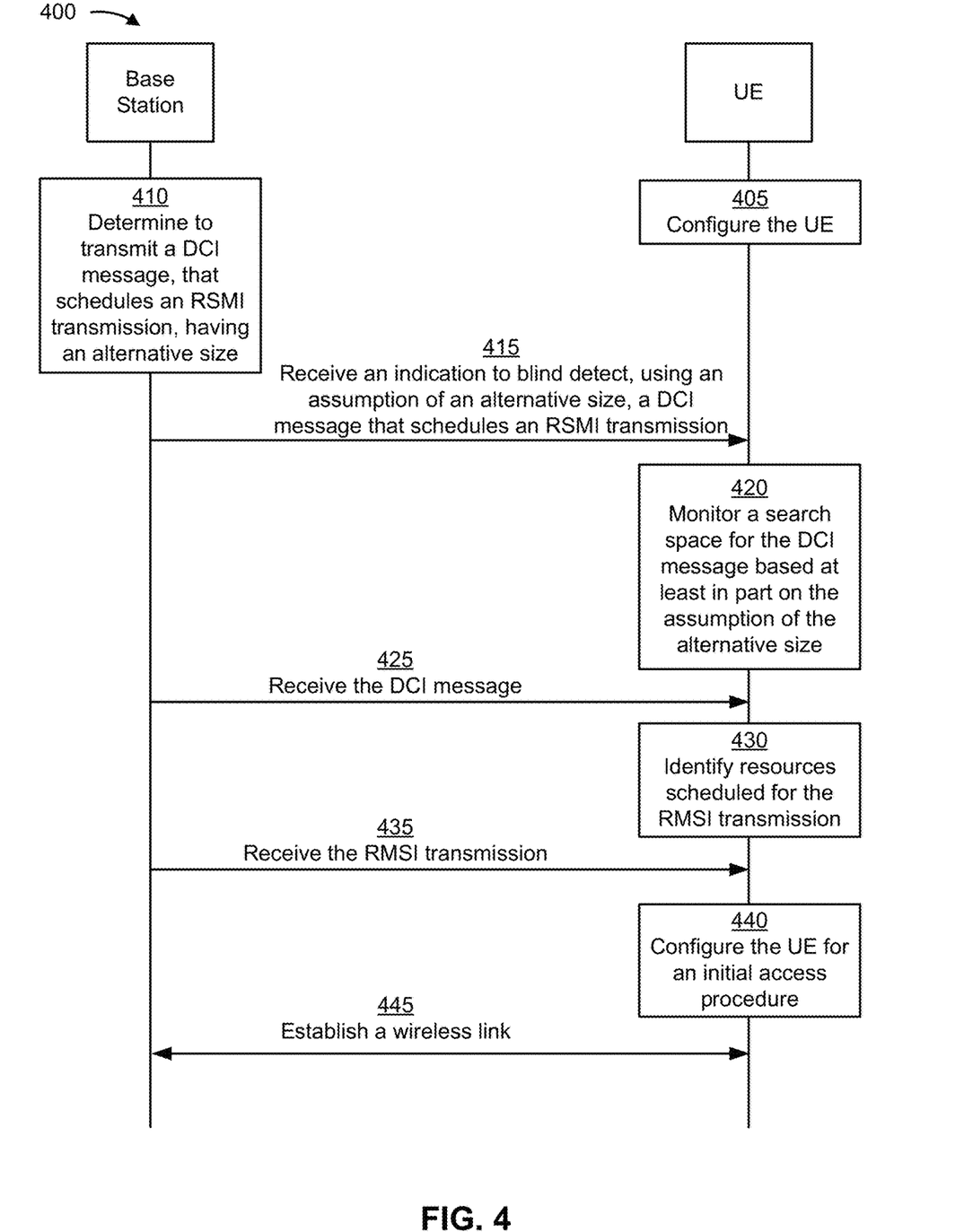
FIG. 4 is a diagram illustrating an example of configuring an alternative size for downlink control information messages for scheduling remaining minimum system information transmissions, in accordance with the present disclosure.

FIG. 4 is a diagram illustrating an example 400 of configuring an alternative size for DCI messages for scheduling RMSI transmissions, in accordance with the present disclosure. As shown in FIG. 4, a UE (e.g., UE 120) may receive transmissions (e.g., broadcast information) from a base station (e.g., base station 110). The UE may attempt to establish a wireless link with the base station to gain access to a wireless network (e.g., wireless network 100). In some aspects, the wireless link may be associated with a frequency range (e.g., FR2 or above), a 5G RAT, a RAT associated with directional beams, and/or the like. In some aspects, the UE may be near an outer limit of a coverage area of the base station.

As shown in FIG. 4, and by reference number 405, the UE may configure the UE. In some aspects, the UE may be configured based at least in part on configuration information received (e.g., from another base station, via another network, via preconfigured data, and/or the like) before attempting an initial access with the base station. In some aspects, the UE may be configured to communicate based at least in part on one or more radio access technology (RAT) standards.

In some aspects, the UE may be configured to attempt to decode a DCI message that schedules an RMSI transmission based at least in part on an assumption of a default size (e.g., a fallback size) for the DCI message. In some aspects, the UE may be configured to attempt to decode a DCI message that schedules an RMSI transmission based at least in part on an assumption of an alternative size based at least in part on one or more conditions. For example, the UE may be configured to attempt to decode a DCI message that schedules an RMSI transmission, that is based at least in part on an assumption of the alternative size, based at least in part on receiving an indication (e.g., an explicit indication, an implicit indication, and/or the like), a location of the UE, a frequency associated with downlink transmissions by the base station, and/or the like.

In some aspects, the UE may be configured with one or more sizes and/or configurations of DCI messages having alternative sizes. In some aspects, the size or the configuration may be based at least in part on a RAT standard, a frequency associated with the DCI messages (e.g., based at least in part on a frequency of an associated PBCH transmission, an indication of the PBCH transmission, a transmission that schedules a channel state information reference signal (CSI-RS), and/or the like), and/or the like.

As shown by reference number 410, the base station may determine to transmit a DCI message, that schedules an RMSI transmission, having an alternative size. In some aspects, the base station may determine to transmit the DCI message with the alternative size based at least in part on a RAT standard associated with the DCI message. In some aspects, the base station may determine to transmit the DCI message with the alternative size based at least in part on results of a previous occasion of a PBCH transmission. For example, based at least in part on an uplink transmission associated with the previous occasion that indicates that one or more UEs are near outer limits of the coverage area of the base station, the base station may determine to transmit the DCI message with the alternative size. In some aspects, the base station may determine to transmit the DCI message with the alternative size based at least in part on received power of uplink transmissions from one or more connected UEs. For example, the base station may determine to transmit the DCI message with the alternative size based at least in part on one or more RSRP measurements. In some aspect, the base station may be configured to transmit some or all DCI messages with the alternative size based at least in part on a deployment configuration of the base station. For example, if the network is configured such that the base station is to provide coverage for one or more UEs that are outside of a range of the DCI message if transmitted using a default size, the network may transmit some or all DCI messages that schedule RMSI transmissions with the alternative size.

In some aspects, the base station may determine a size or a configuration of the DCI message having the alternative size based at least in part on the RAT standard associated with the DCI message, a frequency associated with the DCI message, and/or the like.

As shown by reference number 415, the base station may transmit, and the UE may receive, an indication to attempt to decode, using an assumption of an alternative size, a DCI message that schedules an RMSI transmission. In some aspects, the UE may receive the indication via a PBCH message. In some aspects, the PBCH message may include a single bit indication that the DCI message may have the alternative size or that the DCI message will have the alternative size. For example, the PBCH message may include a one-bit flag that indicates the alternative size for the DCI or a possibility of the alternative size for the DCI (e.g., to be used by the UE or blind detection of the DCI).

In some aspects, the PBCH message may use one or more bitfields (e.g., used for configuration of a CORESET (CORESET0)) to indicate that the DCI message may have the alternative size or that the DCI message will have the alternative size. For example, the PBCH message may include one or more bits used to indicate a configuration of the CORESET. The configuration of the CORESET may be associated with attempting to decode one or more DCI messages based at least in part on the assumption of the alternative size. For example, a column may be added to one or more configuration tables of PDCCH monitoring occasions for a Type0-PDCCH common search space (e.g., a table for Synchronization Signal PBCH block (SSB) and/or CORESET multiplexing pattern 1 and frequency range 2) to indicate that the alternative size for the DCI may be used.

In some aspects, the UE may receive the indication implicitly via one or more other transmissions. For example, an indication of repetition for the DCI message and/or CSI-RS scheduling before the DCI message (e.g., via the PBCH) may implicitly indicate that the UE is to attempt to receive the DCI message based at least in part on the assumption of the alternative size.

As shown by reference number 420, the UE may monitor the search space for the DCI message based at least in part on the assumption of the alternative size. For example, the UE may monitor the search space for the DCI message, using the assumption of the alternative size, based at least in part on receiving an explicit or implicit indication that the alternative size may be used or that the alternative size will be used for the DCI message that schedules the RMSI transmission. In some aspects, the UE may perform a blind detection within the search space in which the UE attempts to decode prospective DCI messages within the search space based at least in part on an assumption of the alternative size and (e.g., simultaneously) based at least in part on an assumption of a standard size for DCI messages.

As shown by reference number 425, the base station may transmit, and the UE may receive, the DCI message. In some aspects, the base station may transmit DCI messages that schedule RMSI transmissions that use a default size during some PBCH occasions and may transmit DCI messages that schedule RMSI transmissions that use the alternative size during other PBCH occasions.

In some aspects, the DCI message may include one or more repetitions of an indication of a resource for the RMSI transmission. Based at least in part on the base station transmitting the DCI message with one or more repetitions of the indication of the resource for the RMSI transmission, the UE may have an increased likelihood (e.g., compared with only a single instance of the RMSI) of receiving the indication of the resource for the RMSI transmission.

As shown by reference number 430, the UE may identify resources scheduled for the RMSI transmission. In some aspects, the resources scheduled for the RMSI transmission may be located within a physical downlink shared channel (PDSCH). In some aspects, based at least in part on the UE receiving the DCI message (e.g., based at least in part on an extended coverage of the DCI message transmitted using the alternative size), the UE may identify a resource for the RMSI transmission. The UE may monitor the resource for the RMSI transmission and decode the RMSI transmission.

As shown by reference number 435, the base station may transmit, and the UE may receive, the RMSI transmission. In some aspects, the RMSI may include information for the UE to access a cell provided by the base station. For example, the RMSI may identify random access parameters, information for receiving additional system information (e.g., via additional system information blocks (SIBs)), a physical random access channel configuration for requesting system information, radio resource configuration information, and/or the like. In some aspects, the UE may use information from the PBCH to decode the RMSI transmission.

As shown by reference number 440, the UE may configure the UE for an initial access procedure based at least in part on the RMSI. For example, the UE may use system information obtained from the RMSI to receive additional system information, configure the UE to perform a physical random access channel process to request system information, and/or the like. In some aspects, the UE may use the RMSI to determine (e.g., select) a random access procedure to attempt to gain access to the cell of the network provided by the base station.

As shown by reference number 445, the UE may establish a wireless link with the base station. For example, the UE may complete a random access process to establish the wireless link with the base station. In some aspects, the UE and the base station may communicate via directional beams to improve coverage of uplink and/or downlink transmissions.

Based at least in part on the base station indicating (e.g., via the PBCH) that the UE is to attempt to decode the DCI message, based at least in part on the assumption of the alternative size, the UE may be configured to attempt to receive the DCI message with the assumption of the alternative size. The base station may then transmit the DCI message with the alternative size, which may improve a coverage area of the transmission of the DCI message that schedules the RMSI transmission. This may improve a likelihood that the UE receives the DCI message (e.g., relative to using a default size) and that the UE receives the RMSI to configure the UE for establishing a wireless link with the base station. In this way, the UE may conserve computing, communication, and/or network resources that may otherwise have been used to repeatedly attempt and fail to establish a wireless link with the base station based at least in part on the UE being near the outer limit of a coverage area of the base station.

As indicated above, FIG. 4 is provided as an example. Other examples may differ from what is described with respect to FIG. 4.

Figure 5:
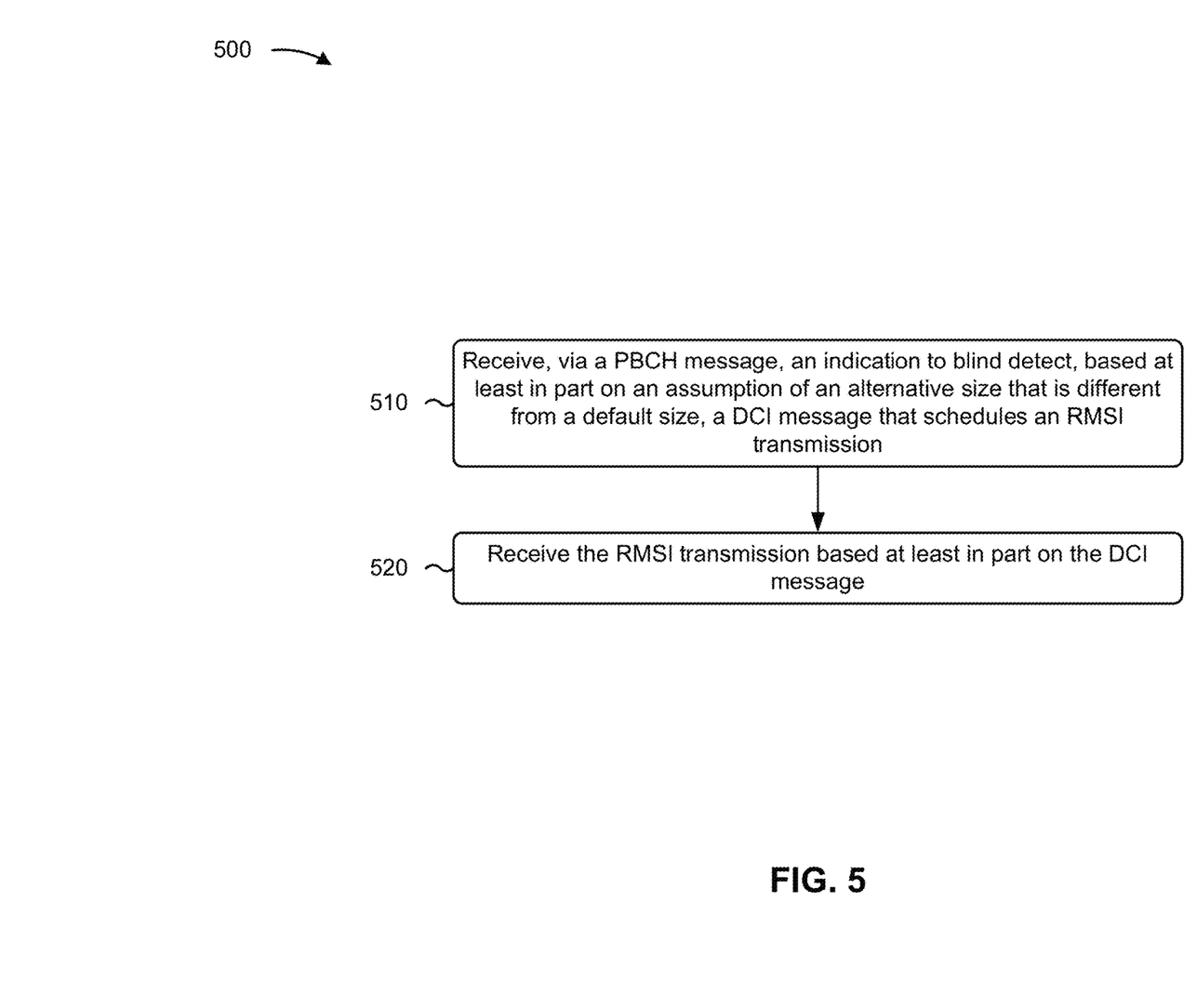
FIG. 5 is a diagram illustrating an example process performed, for example, by a user equipment, in accordance with the present disclosure.

FIG. 5 is a diagram illustrating an example process 500 performed, for example, by a UE, in accordance with the present disclosure. Example process 500 is an example where the UE (e.g., UE 120 and/or the like) performs operations associated with an alternative size for DCI that schedule RMSI transmissions.

As shown in FIG. 5, in some aspects, process 500 may include receiving, via a PBCH message, an indication to attempt to decode, based at least in part on an assumption of an alternative size that is different from a default size, a DCI message that schedules a RMSI transmission (block 510). For example, the UE (e.g., using antenna 252, DEMOD 254, MIMO detector 256, receive processor 258, controller/processor 280, memory 282, and/or the like) may receive, via a PBCH message, an indication to attempt to decode, based at least in part on an assumption of an alternative size that is different from a default size, a DCI message that schedules a RMSI transmission, as described above, for example, with reference to FIG. 4.

As further shown in FIG. 5, in some aspects, process 500 may include receiving the RMSI transmission based at least in part on the DCI message (block 520). For example, the UE (e.g., using antenna 252, DEMOD 254, MIMO detector 256, receive processor 258, controller/processor 280, memory 282, and/or the like) may receive the RMSI transmission based at least in part on the DCI message, as described above, for example, with reference to FIG. 4.

Process 500 may include additional aspects, such as any single aspect or any combination of aspects described below and/or in connection with one or more other processes described elsewhere herein.

In a first aspect, the indication via the PBCH message includes a single bit indication that the DCI message may have the alternative size, or a single bit indication that the DCI message will have the alternative size.

In a second aspect, alone or in combination with the first aspect, the indication via the PBCH message comprises one or more bits used to indicate a configuration of a CORESET.

In a third aspect, alone or in combination with one or more of the first and second aspects, the configuration of the CORESET is associated with attempting to decode one or more DCI messages based at least in part on the assumption of the alternative size.

In a fourth aspect, alone or in combination with one or more of the first through third aspects, one or more of a size or a configuration of DCI messages having the alternative size is based at least in part on a RAT standard.

In a fifth aspect, alone or in combination with one or more of the first through fourth aspects, one or more of a size or a configuration of DCI messages having the alternative size is based at least in part on a frequency associated with the DCI messages.

In a sixth aspect, alone or in combination with one or more of the first through fifth aspects, the DCI message includes one or more repetitions of an indication of a resource for the RMSI transmission.

In a seventh aspect, alone or in combination with one or more of the first through sixth aspects, receiving the indication to attempt to decode the DCI message based at least in part on the assumption of the alternative size includes receiving an indication that schedules a CSI-RS, the indication that schedules the CSI-RS is an implicit indication to attempt to decode the DCI message based at least in part on the assumption of the alternative size.

In an eighth aspect, alone or in combination with one or more of the first through seventh aspects, the indication to attempt to decode the DCI message based at least in part on the assumption of the alternative size indicates a possibility of using the alternative size for the DCI message, and the UE is to attempt to receive the DCI message based at least in part on the assumption of the alternative size and the UE is to attempt to receive the DCI message based at least in part on an assumption of a standard size for DCI messages.

In a ninth aspect, alone or in combination with one or more of the first through eighth aspects, the indication to attempt to decode the DCI message based at least in part on the assumption of the alternative size indicates that the DCI message will have the alternative size.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
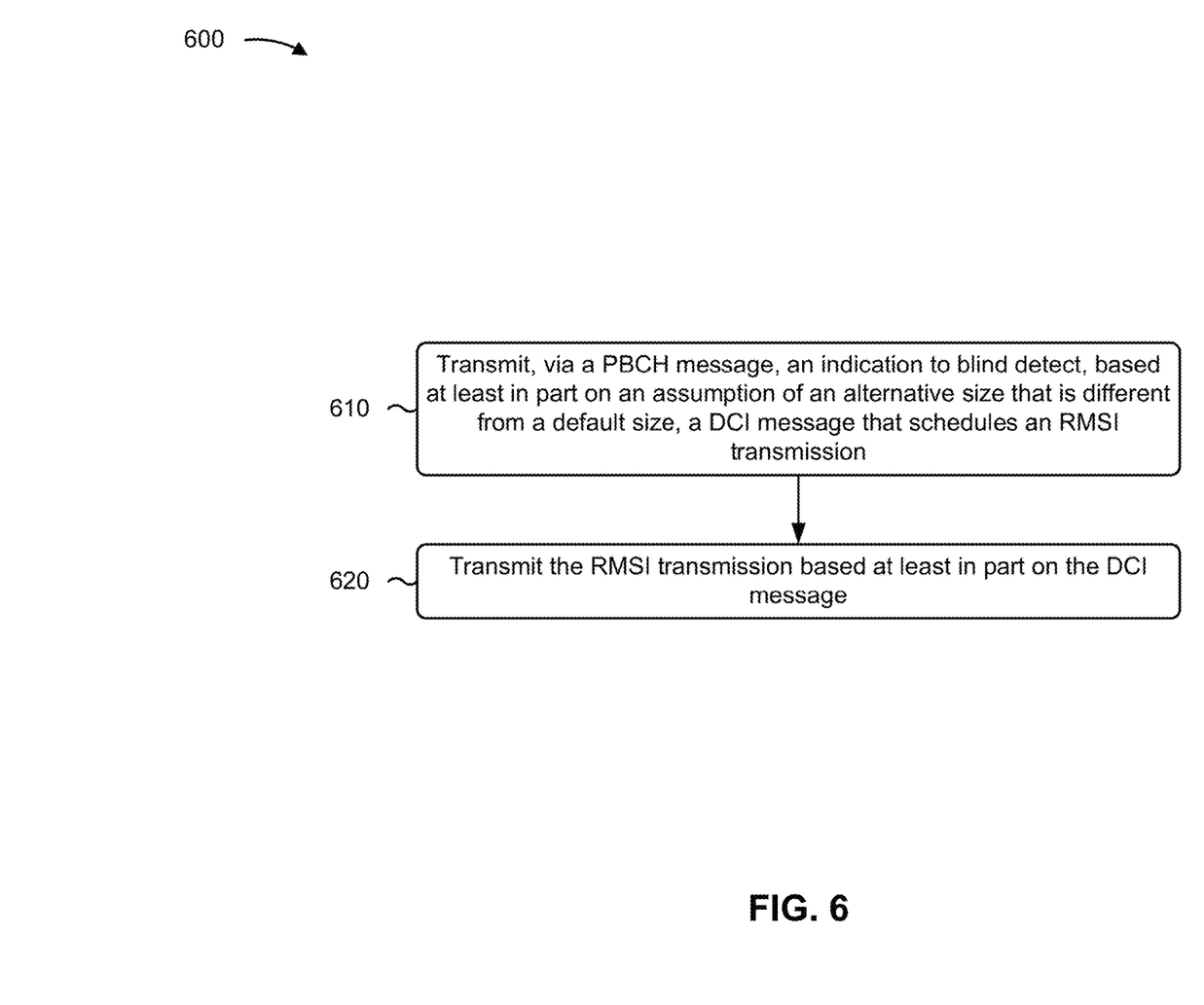
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110 and/or the like) performs operations associated with an alternative size for DCI messages for scheduling RMSI transmissions.

As shown in FIG. 6, in some aspects, process 600 may include transmitting, via a PBCH message, an indication to attempt to decode, based at least in part on an assumption of an alternative size that is different from a default size, a DCI message that schedules a RMSI transmission (block 610). For example, the base station (e.g., using controller/processor 240, transmit processor 220, TX MIMO processor 230, MOD 232, antenna 234, memory 242, and/or the like) may transmit, via a PBCH message, an indication to attempt to decode, based at least in part on an assumption of an alternative size that is different from a default size, a DCI message that schedules a RMSI transmission, as described above, for example, with reference to FIG. 4.

As further shown in FIG. 6, in some aspects, process 600 may include transmitting the RMSI transmission based at least in part on the DCI message (block 620). For example, the base station (e.g., using controller/processor 240, transmit processor 220, TX MIMO processor 230, MOD 232, antenna 234, memory 242, and/or the like) may transmit the RMSI transmission based at least in part on the DCI message, as described above, for example, with reference to FIG. 4.

Process 600 may include additional aspects, such as any single aspect or any combination of aspects described below and/or in connection with one or more other processes described elsewhere herein.

In a first aspect, the indication via the PBCH message includes a single bit indication that the DCI message may have the alternative size, or a single bit indication that the DCI message will have the alternative size.

In a second aspect, alone or in combination with the first aspect, the indication via the PBCH message includes one or more bits used to indicate a configuration of a CORESET.

In a third aspect, alone or in combination with one or more of the first and second aspects, the configuration of the CORESET is associated with attempting to decode one or more DCI messages based at least in part on the assumption of the alternative size.

In a fourth aspect, alone or in combination with one or more of the first through third aspects, one or more of a size or a configuration of DCI messages having the alternative size is based at least in part on a RAT standard.

In a fifth aspect, alone or in combination with one or more of the first through fourth aspects, one or more of a size or a configuration of DCI messages having the alternative size is based at least in part on a frequency associated with the DCI message.

In a sixth aspect, alone or in combination with one or more of the first through fifth aspects, the DCI message includes one or more repetitions of an indication of a resource for the RMSI transmission.

In a seventh aspect, alone or in combination with one or more of the first through sixth aspects, transmitting the indication to attempt to decode the DCI message based at least in part on the assumption of the alternative size includes transmitting an indication that schedules a CSI-RS, wherein the indication that schedules the CSI-RS is an implicit indication to attempt to decode the DCI message based at least in part on the assumption of the alternative size.

In an eighth aspect, alone or in combination with one or more of the first through seventh aspects, the indication to attempt to decode the DCI message based at least in part on the assumption of the alternative size indicates a possibility of using the alternative size for the DCI message, and a UE that receives the indication is to attempt to receive the DCI message based at least in part on the assumption of the alternative size and the UE is to attempt to receive the DCI message based at least in part on an assumption of a standard size for DCI messages.

In a ninth aspect, alone or in combination with one or more of the first through eighth aspects, the indication to attempt to decode the DCI message based at least in part on the assumption of the alternative size indicates that the DCI message will have the alternative size.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The following provides an overview of some Aspects of the present disclosure:

Aspect 1: A method of wireless communication performed by a user equipment (UE), comprising: receiving, via a physical broadcast channel message, an indication to blind detect, based at least in part on an assumption of an alternative size that is different from a default size, a downlink control information (DCI) message that schedules a remaining minimum system information (RMSI) transmission; and receiving the RMSI transmission based at least in part on the DCI message.

Aspect 2: The method of Aspect 1, wherein the indication via the physical broadcast channel message comprises: a single bit indication that the DCI message may have the alternative size, or a single bit indication that the DCI message will have the alternative size.

Aspect 3: The method of any of Aspects 1-3, wherein the indication via the physical broadcast channel message comprises one or more bits used to indicate a configuration of a CORESET.

Aspect 4: The method of Aspect 3, wherein the configuration of the CORESET is associated with blind detecting one or more DCI messages based at least in part on the assumption of the alternative size.

Aspect 5: The method of any of Aspects 1-4, wherein one or more of a size or a configuration of DCI messages having the alternative size is based at least in part on a radio access technology (RAT) standard.

Aspect 6: The method of any of Aspects 1-5, wherein one or more of a size or a configuration of DCI messages having the alternative size is based at least in part on one or more of: a frequency range or frequency band associated with the DCI messages having the alternative size, or a frequency allocation of a CORESET that is associated with the DCI messages having the alternative size.

Aspect 7: The method of any of Aspects 1-6, wherein the DCI message includes one or more repetitions of an indication of a resource for the RMSI transmission.

Aspect 8: The method of any of Aspects 1-7, wherein receiving the indication to blind detect the DCI message based at least in part on the assumption of the alternative size comprises: receiving an indication that schedules a channel state information reference signal (CSI-RS), wherein the indication that schedules the CSI-RS is an implicit indication to blind detect the DCI message based at least in part on the assumption of the alternative size.

Aspect 9: The method of any of Aspects 1-8, wherein receiving the indication to blind detect the DCI message based at least in part on the assumption of the alternative size comprises: receiving an indication that schedules a channel state information reference signal (CSI-RS).

Aspect 10: The method of any of Aspects 1-9, wherein the indication to blind detect the DCI message based at least in part on the assumption of the alternative size indicates a possibility of using the alternative size for the DCI message, and wherein the UE is to attempt to receive the DCI message based at least in part on the assumption of the alternative size and the UE is to attempt to receive the DCI message based at least in part on an assumption of a standard size for DCI messages.

Aspect 11: The method of any of Aspects 1-10, wherein the indication to blind detect the DCI message based at least in part on the assumption of the alternative size indicates that the DCI message will have the alternative size.

Aspect 12: A method of wireless communication performed by a base station, comprising: transmitting, via a physical broadcast channel message, an indication to attempt to decode, based at least in part on an assumption of an alternative size that is different from a default size, a downlink control information (DCI) message that schedules a remaining minimum system information (RMSI) transmission; and transmitting the RMSI transmission based at least in part on the DCI message.

Aspect 13: The method of Aspect 12, wherein the indication via the physical broadcast channel message comprises: a single bit indication that the DCI message may have the alternative size, or a single bit indication that the DCI message will have the alternative size.

Aspect 14: The method of any of Aspects 12-13, wherein the indication via the physical broadcast channel message comprises one or more bits used to indicate a configuration of a CORESET.

Aspect 15: The method of Aspect 14, wherein the configuration of the CORESET is associated with blind detecting one or more DCI messages based at least in part on the assumption of the alternative size.

Aspect 16: The method of any of Aspects 12-15, wherein one or more of a size or a configuration of DCI messages having the alternative size is based at least in part on a radio access technology (RAT) standard.

Aspect 17: The method of any of Aspects 12-16, wherein one or more of a size or a configuration of DCI messages having the alternative size is based at least in part on one or more of: a frequency range or frequency band associated with the DCI messages having the alternative size, or a frequency allocation of a CORESET that is associated with the DCI messages having the alternative size.

Aspect 18: The method of any of Aspects 12-17, wherein the DCI message includes one or more repetitions of an indication of a resource for the RMSI transmission.

Aspect 19: The method of any of Aspects 12-18, wherein transmitting the indication to blind detect the DCI message based at least in part on the assumption of the alternative size comprises: transmitting an indication that schedules a channel state information reference signal (CSI-RS), wherein the indication that schedules the CSI-RS is an implicit indication to blind detect the DCI message based at least in part on the assumption of the alternative size.

Aspect 20: The method of any of Aspects 12-19, wherein transmitting the indication to blind detect the DCI message based at least in part on the assumption of the alternative size comprises: transmitting an indication that schedules a channel state information reference signal (CSI-RS).

Aspect 21: The method of any of Aspects 12-20, wherein the indication to blind detect the DCI message based at least in part on the assumption of the alternative size indicates a possibility of using the alternative size for the DCI message, and wherein a user equipment (UE) is to attempt to receive the DCI message based at least in part on the assumption of the alternative size and the UE is to attempt to receive the DCI message based at least in part on an assumption of a standard size for DCI messages.

Aspect 22: The method of any of Aspects 12-21, wherein the indication to blind detect the DCI message based at least in part on the assumption of the alternative size indicates that the DCI message will have the alternative size.

Aspect 23: An apparatus for wireless communication at a device, comprising a processor; memory coupled with the processor; and instructions stored in the memory and executable by the processor to cause the apparatus to perform the method of one or more Aspects of Aspects 1-22.

Aspect 24: A device for wireless communication, comprising a memory and one or more processors coupled to the memory, the memory and the one or more processors configured to perform the method of one or more Aspects of Aspects 1-22.

Aspect 25: An apparatus for wireless communication, comprising at least one means for performing the method of one or more Aspects of Aspects 1-22.

Aspect 26: A non-transitory computer-readable medium storing code for wireless communication, the code comprising instructions executable by a processor to perform the method of one or more Aspects of Aspects 1-22.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
 receiving, via a physical broadcast channel message, an indication that schedules a channel state information reference signal (CSI-RS), wherein the indication that schedules the CSI-RS is an implicit indication to blind detect, based at least in part on an assumption of an alternative size that is different from a default size, a downlink control information (DCI) message that schedules a remaining minimum system information (RMSI) transmission,
   wherein one or more of a size or a configuration of DCI messages having the alternative size is based at least in part on a frequency range or frequency band associated with the DCI messages having the alternative size, a frequency allocation of a control resource set (CORESET) that is associated with the DCI messages having the alternative size, or any combination thereof; and
   receiving the RMSI transmission based at least in part on the DCI message.

2. The method of claim 1, wherein the indication via the physical broadcast channel message comprises:
   a single bit indication that the DCI message may have the alternative size, or
   a single bit indication that the DCI message will have the alternative size.

3. The method of claim 1, wherein the indication via the physical broadcast channel message comprises one or more bits used to indicate a configuration of the CORESET.

4. The method of claim 3, wherein the configuration of the CORESET is associated with blind detecting one or more DCI messages based at least in part on the assumption of the alternative size.

5. The method of claim 1, wherein the DCI message includes one or more repetitions of an indication of a resource for the RMSI transmission.

6. The method of claim 1, wherein the indication to blind detect the DCI message based at least in part on the assumption of the alternative size indicates a possibility of using the alternative size for the DCI message, and
   wherein the UE is to attempt to receive the DCI message based at least in part on the assumption of the alternative size and the UE is to attempt to receive the DCI message based at least in part on an assumption of a standard size for DCI messages.

7. The method of claim 1, wherein the indication to blind detect the DCI message based at least in part on the assumption of the alternative size indicates that the DCI message will have the alternative size.

8. The method of claim 1, wherein one or more of the size or the configuration of the DCI messages is further based at least in part on a radio access technology (RAT) standard.

9. A method of wireless communication performed by a base station, comprising:
   transmitting, via a physical broadcast channel message, an indication that schedules a channel state information reference signal (CSI-RS), wherein the indication that schedules the CSI-RS is an implicit indication to attempt to decode, based at least in part on an assumption of an alternative size that is different from a default size, a downlink control information (DCI) message that schedules a remaining minimum system information (RMSI) transmission,
   wherein one or more of a size or a configuration of DCI messages having the alternative size is based at least in part on a frequency range or frequency band associated with the DCI messages having the alternative size, a frequency allocation of a control resource set (CORESET) that is associated with the DCI messages having the alternative size, or any combination thereof; and
   transmitting the RMSI transmission based at least in part on the DCI message.

10. The method of claim 9, wherein the indication via the physical broadcast channel message comprises:
   a single bit indication that the DCI message may have the alternative size, or
   a single bit indication that the DCI message will have the alternative size.

11. The method of claim 9, wherein the indication via the physical broadcast channel message comprises one or more bits used to indicate a configuration of the CORESET.

12. The method of claim 11, wherein the configuration of the CORESET is associated with blind detecting one or more DCI messages based at least in part on the assumption of the alternative size.

13. The method of claim 9, wherein the DCI message includes one or more repetitions of an indication of a resource for the RMSI transmission.

14. The method of claim 9, wherein the indication to blind detect the DCI message based at least in part on the assumption of the alternative size indicates a possibility of using the alternative size for the DCI message, and
   wherein a user equipment (UE) is to attempt to receive the DCI message based at least in part on the assumption of the alternative size and the UE is to attempt to receive the DCI message based at least in part on an assumption of a standard size for DCI messages.

15. The method of claim 9, wherein the indication to blind detect the DCI message based at least in part on the assumption of the alternative size indicates that the DCI message will have the alternative size.

16. The method of claim 9, wherein one or more of the size or the configuration of the DCI messages is further based at least in part on a radio access technology (RAT) standard.

17. A user equipment (UE) for wireless communication, comprising:
   a memory;
   a transceiver; and
   one or more processors coupled to the memory, the one or more processors configured to:
      receive, via a physical broadcast channel message using the transceiver, an indication that schedules a channel state information reference signal (CSI-RS), wherein the indication that schedules the CSI-RS is an implicit indication to attempt to decode, based at least in part on an assumption of an alternative size that is different from a default size, a downlink control information (DCI) message that schedules a remaining minimum system information (RMSI) transmission,
         wherein one or more of a size or a configuration of DCI messages having the alternative size is based at least in part on a frequency range or frequency band associated with the DCI messages having the alternative size, a frequency allocation of a control resource set (CORESET) that is associated with the DCI messages having the alternative size, or any combination thereof; and
      receive, using the transceiver, the RMSI transmission based at least in part on the DCI message.

18. The UE of claim 17, wherein the indication via the physical broadcast channel message comprises:

a single bit indication that the DCI message may have the alternative size, or a single bit indication that the DCI message will have the alternative size.

19. The UE of claim 17, wherein the indication via the physical broadcast channel message comprises one or more bits used to indicate a configuration of the CORESET.

20. The UE of claim 19, wherein the configuration of the CORESET is associated with blind detecting one or more DCI messages based at least in part on the assumption of the alternative size.

21. The UE of claim 17, wherein the DCI message includes one or more repetitions of an indication of a resource for the RMSI transmission.

22. The UE of claim 17, wherein one or more of the size or the configuration of the DCI messages is further based at least in part on a radio access technology (RAT) standard.

23. The UE of claim 17, wherein the indication to blind detect the DCI message based at least in part on the assumption of the alternative size indicates a possibility of using the alternative size for the DCI message, and wherein the UE is to attempt to receive the DCI message based at least in part on the assumption of the alternative size and the UE is to attempt to receive the DCI message based at least in part on an assumption of a standard size for DCI messages.

24. A base station for wireless communication, comprising:

a memory; and one or more processors coupled to the memory, the one or more processors configured to:

transmit, via a physical broadcast channel message, an indication that schedules a channel state information reference signal (CSI-RS), wherein the indication that schedules the CSI-RS is an implicit indication to attempt to decode, based at least in part on an assumption of an alternative size that is different from a default size, a downlink control information (DCI) message that schedules a remaining minimum system information (RMSI) transmission, wherein one or more of a size or a configuration of DCI messages having the alternative size is based at least in part on a frequency range or frequency band associated with the DCI messages having the alternative size, a frequency allocation of a control resource set (CORESET) that is associated with the DCI messages having the alternative size, or any combination thereof; and transmit the RMSI transmission based at least in part on the DCI message.

25. The base station of claim 24, wherein the indication via the physical broadcast channel message comprises:

a single bit indication that the DCI message may have the alternative size, or a single bit indication that the DCI message will have the alternative size.

26. The base station of claim 24, wherein the indication via the physical broadcast channel message comprises one or more bits used to indicate a configuration of the CORESET.

27. The base station of claim 26, wherein the configuration of the CORESET is associated with blind detecting one or more DCI messages based at least in part on the assumption of the alternative size.

28. The base station of claim 24, wherein the DCI message includes one or more repetitions of an indication of a resource for the RMSI transmission.

29. The base station of claim 24, wherein one or more of the size or the configuration of the DCI messages is further based at least in part on a radio access technology (RAT) standard.

30. The base station of claim 24, wherein the indication to blind detect the DCI message based at least in part on the assumption of the alternative size indicates a possibility of using the alternative size for the DCI message, and wherein a user equipment (UE) is to attempt to receive the DCI message based at least in part on the assumption of the alternative size and the UE is to attempt to receive the DCI message based at least in part on an assumption of a standard size for DCI messages.

* * * * *